US006924567B2

(12) United States Patent
Killian et al.

(10) Patent No.: US 6,924,567 B2
(45) Date of Patent: Aug. 2, 2005

(54) METHOD AND SYSTEM FOR MANAGING BATTERY POWER

(75) Inventors: Daniel J. Killian, Holladay, TN (US); Nathaniel D. Brown, Wetmore, CO (US); Fernando A. Pereira, Pompano Beach, FL (US); Roger N. Wurtele, Plano, TX (US)

(73) Assignee: Energy & Engine Technology Corporation, Plano, TX (US)

( * ) Notice: Subject to any disclaimer, the term of this patent is extended or adjusted under 35 U.S.C. 154(b) by 0 days.

(21) Appl. No.: 10/957,933

(22) Filed: Oct. 4, 2004

(65) Prior Publication Data

US 2005/0077866 A1 Apr. 14, 2005

Related U.S. Application Data

(60) Provisional application No. 60/509,681, filed on Oct. 8, 2003.

(51) Int. Cl.[7] .............................. H02J 1/12; H02J 7/00
(52) U.S. Cl. ........................ 307/46; 320/104; 320/138; 307/86
(58) Field of Search ..................... 307/46, 66; 320/103, 320/104, 138

(56) References Cited

U.S. PATENT DOCUMENTS

| 3,962,621 A | 6/1976 | Raver ......................... 320/123 |
| 4,010,410 A | 3/1977 | Kilbourn .................... 320/152 |
| 4,131,829 A | 12/1978 | Gocho ........................ 318/139 |
| 4,672,293 A | 6/1987 | Crampton ................... 320/128 |
| 4,916,329 A | * 4/1990 | Dang et al. .................... 307/66 |
| 6,057,669 A | 5/2000 | Lai et al. ..................... 320/116 |
| 6,100,664 A | 8/2000 | Oglesbee et al. ........... 320/125 |
| RE37,678 E | 4/2002 | Ikawa et al. ................ 320/136 |
| 6,479,970 B2 | 11/2002 | Reddy ......................... 320/162 |
| 6,664,762 B2 | 12/2003 | Kutkut ........................ 320/116 |
| 6,750,631 B2 | 6/2004 | Perelle ........................ 320/116 |

FOREIGN PATENT DOCUMENTS

| JP | 07099701 | * 4/1995 |
| JP | 09252547 | * 9/1997 |

OTHER PUBLICATIONS

Davis et al.; *Comparison of a Synergetic Battery Pack Drive System to a Pulse Width Modulated AC Induction Motor Drive for an Electric Vehicle*; IEEE Transactions on Energy Conversion; Jun. 1999; vol. 14, No. 2; pp. 245–250.

Kinoshita et al.; *Adapter–charger for portable VTRs*; National Technical Report; Abstract No. B87036029; vol. 32, No. 5, Oct., 1986; pp. 686–693.

Kuzara, Casey; *Today's UPS Gives Users the Power to Choose*; Electronic Engineering Times, 1989, No. 563, 43.

* cited by examiner

*Primary Examiner*—Pia Tibbits
(74) *Attorney, Agent, or Firm*—King & Spalding LLP

(57) ABSTRACT

An exchanger switch for use with a plurality of batteries that extends the useful life of the batteries. In a generator, a first battery can provide power to an external load while also providing power to recharge a second battery. When the first battery is depleted to a certain voltage level, the exchanger switch is activated and the second battery can begin providing power to the external load. The exchanger switch also directs a portion of the power from the second battery to recharging the first battery. The exchanger switch allows the generator to continue providing power to the external load without interruption. Using the batteries as alternating power sources allows the exchanger switch to increase the useful life of the batteries.

27 Claims, 5 Drawing Sheets

METHOD AND SYSTEM FOR MANAGING BATTERY POWER

This application claims priority to U.S. Provisional Patent Application Ser. No. 60/509,681, entitled "Reciprocal Electrical Regenerator," filed Oct. 8, 2003, and identifying Daniel J. Killian as the inventor. The subject matter of U.S. Provisional Patent Application Ser. No. 60/509,681 is hereby incorporated by reference in this application.

FIELD OF THE INVENTION

The present invention relates to the field of electricity generation, and more particularly to the efficient use of electric power provided by batteries.

BACKGROUND OF THE INVENTION

The need to extend the life of batteries and to use the power they provide more efficiently is a significant problem in a variety of contexts today. Some of the applications where this need is apparent include battery powered vehicles and battery powered electronic devices. Another application for battery power is stand-alone or self-contained electric generators. While generators can operate on a variety of power sources, including batteries and combustible fuels, batteries are often preferred for reasons discussed further herein. Efficient use of battery power is particularly important for electric generators because they are useful sources of auxiliary power for remote locations where access to the electric power grid is inconvenient or unavailable. Generators can also serve as a back up power source when the electric power grid fails.

One common use for stand-alone generators is in the trucking industry. Truckers often consume significant amounts of diesel fuel while idling in order to provide power to the truck cab. Running the truck's engine to provide power to the cab is wasteful, expensive, and harmful to the environment. In view of these negative factors, recent federal and state laws limit the number of hours per day that truckers may leave their engines idling. As a result, truckers must look to auxiliary power sources, such as stand-alone generators, to provide power to the truck's cab. A generator that uses battery power efficiently to maximize the life of the batteries is particularly useful to the trucking industry.

Other applications for stand-alone generators include use on boats, recreational vehicles, as auxiliary power sources when primary power sources fail, and as power sources in remote locations. In many of these applications, battery powered generators are preferable to those that operate on combustible fuel because the batteries are quieter and do not produce harmful emissions. However, one of the drawbacks with battery powered generators is the limited life of the batteries. Various efforts have been made to extend the useful life of batteries. For example, longer lasting batteries have been constructed with advanced battery chemistries, such as those using lithium. Another solution implemented in some applications is to simply use arrays of multiple batteries. Different power generation applications arrange the batteries in either series or parallel arrays to meet the needs of the load and to extend the life of the batteries to a limited extent.

For example, one solution is described in an article entitled "Comparison of a Synergetic Battery Pack Drive System to a Pulse Width Modulated AC Induction Motor Drive for an Electric Vehicle," published in IEEE Transactions on Energy Conservation, vol. 14, no. 2, June 1999. The article describes a battery pack system designed to monitor and access individual sections of the battery pack to control the discharge of the battery cells. This battery pack system is designed to avoid limiting the performance of the battery pack to the weakest cell. The battery pack system relies on battery reconfiguration techniques to improve overall performance of the battery pack. However, the battery pack system relies on external sources to recharge the batteries.

Other examples in the prior art involve systems for recharging batteries, particularly in vehicles that use electric power. However, many of these prior art solutions rely on external sources of power to recharge the batteries. These solutions do not provide a means to extend the life of batteries in a stand-alone system such as a battery powered generator.

The prior art solutions are limited in their ability to efficiently manage the power capacity of multiple batteries. Accordingly, there is a need in the art for the ability to increase the useful life of combinations of batteries used to provide power. Specifically, there is a need in the art for a system and method to more efficiently use the power provided by batteries, such as those used in generators, so that the useful life of the batteries is extended. A switching method and device is needed that allows a primary battery to provide power to an external load while also recharging a secondary battery. The needed switching method and device should allow the primary battery and the secondary battery to alternate roles so that after a designated time, the secondary battery can provide power to the external load while also recharging the primary battery. There is a further need for a switching method and device that can support the power supply and charging functions for more than two batteries.

SUMMARY OF THE INVENTION

The present invention solves the problems identified above by providing a system and method for managing the use of battery power. A switching system and method supports using a plurality of batteries to provide power. The switching system and method allows a first battery to provide power to an external load while also providing power for recharging a second battery. At a designated time, the switching system and method allow the first battery and the second battery to alternate roles. In other words, at the designated time the second battery can begin providing power to an external load while also providing power to recharge the first battery. The switching system and method allows the first battery and the second battery to alternate roles without interrupting the delivery of power to the external load. The switching system and method also support switching among more than two batteries.

In one aspect, the invention comprises a system for managing the use of battery power in a generator. An inverter receives a direct current from a first battery and converts the direct current to an alternating current for supplying to an external load. A portion of the alternating current is directed to a transformer for increasing the voltage and a rectifier for converting the portion of the alternating current back to a direct current. The direct current from the rectifier is supplied to an exchanger switch that feeds the direct current to a second battery for charging.

In another aspect, the invention comprises a system for managing the use of power from a first battery. An exchanger switch supplies direct current from the first battery to an inverter for converting the direct current to an alternating current. A switch directs a portion of the alternating current to a rectifier for conversion back to a direct current for charging. The exchanger switch supplies the charging direct current from the rectifier to a second battery.

In a further aspect, the invention comprises a method for switching power and recharging functions from a first battery to a second battery. A first battery provides power to an external load while also supplying power to recharge a second battery. When the first battery is depleted to a designated voltage level, the switching device is activated and the second battery begins providing power to the external load while also supplying power to recharge the first battery.

In yet another aspect, the invention comprises a method for managing the use of a first battery and a second battery. An exchanger switch receives a direct current from the first battery which is converted to an alternating current with an inverter. A portion of the alternating current can be converted back to a charging direct current with a rectifier. The exchanger switch supplies the charging direct current to a second battery in need of recharging. The exchanger switch can also support receiving direct current and supplying charging direct current to additional batteries.

The discussion of the invention and its operation presented in this summary is for illustrative purposes only. Various aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

The present invention is directed to a system and method for efficiently managing the use of power supplied by a plurality of batteries. A first battery provides a direct current to an exchanger switch that supplies an inverter. The inverter can convert the direct current to an alternating current which can be used to power an external load. A portion of the alternating current can also be redirected to charge a second battery. Specifically, the redirected current can pass through a transformer and then be converted to a direct current with a rectifier. The rectified direct current passes through the exchanger switch for recharging a second battery. At a designated time or voltage level, the exchanger switch changes the direction of the current flows. Specifically, the exchanger switch draws the primary power from the second battery and provides recharging power to the first battery.

The present invention can be implemented in a variety of different embodiments. The first exemplary embodiment described herein uses two batteries coupled to a mechanical exchanger switch that slides laterally from one set of electrical contacts to another. Another exemplary embodiment of the invention uses an electronic switch to control the source of the direct current and the battery to which the recharging power is supplied. While these and other exemplary embodiments are referenced in the following descriptions, those skilled in the art will recognize the invention is not limited to these examples.

Figure 1:
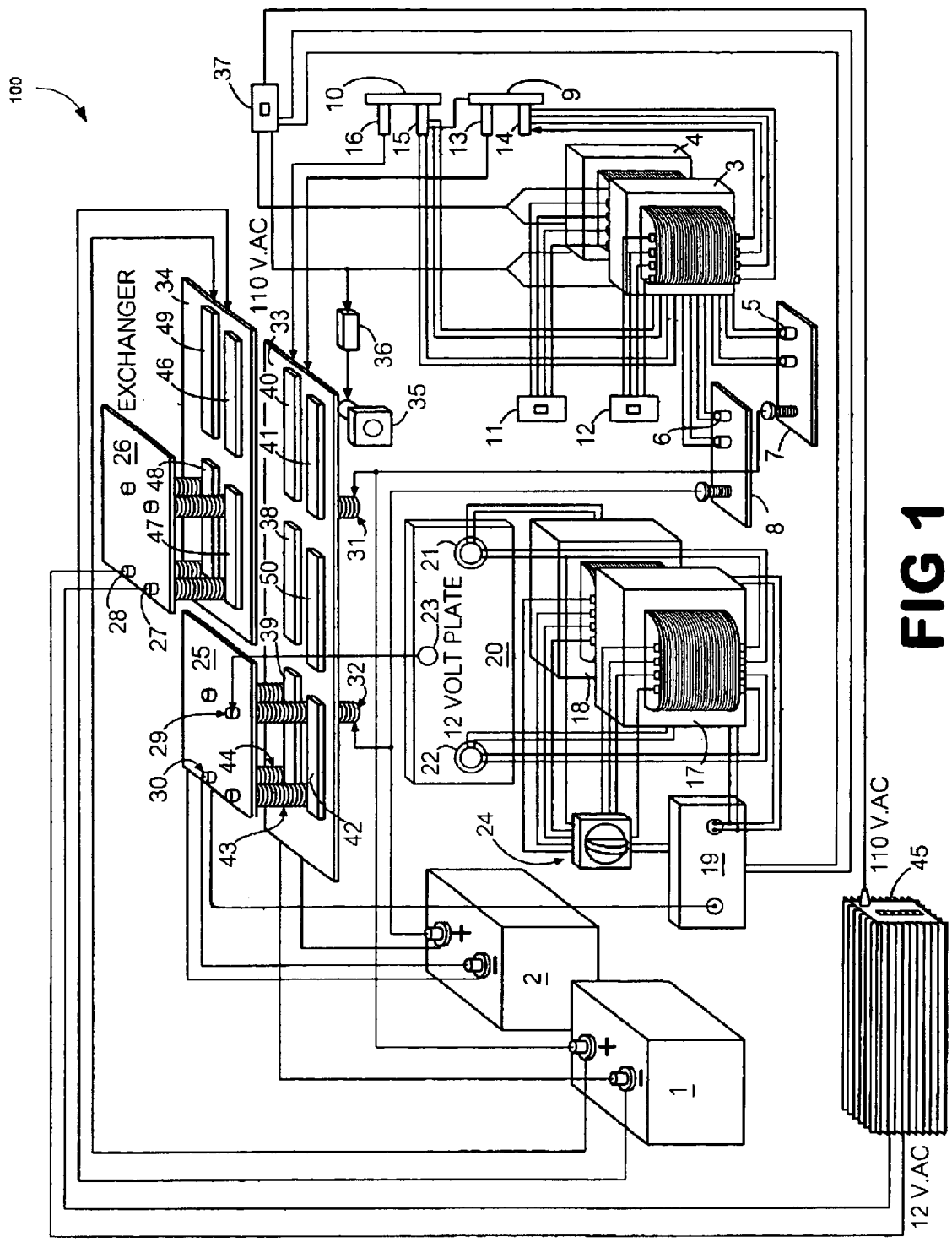
FIG. 1 is a diagram illustrating a generator with two batteries and an exchanger switch in accordance with an exemplary embodiment of the present invention.
Figure 2:
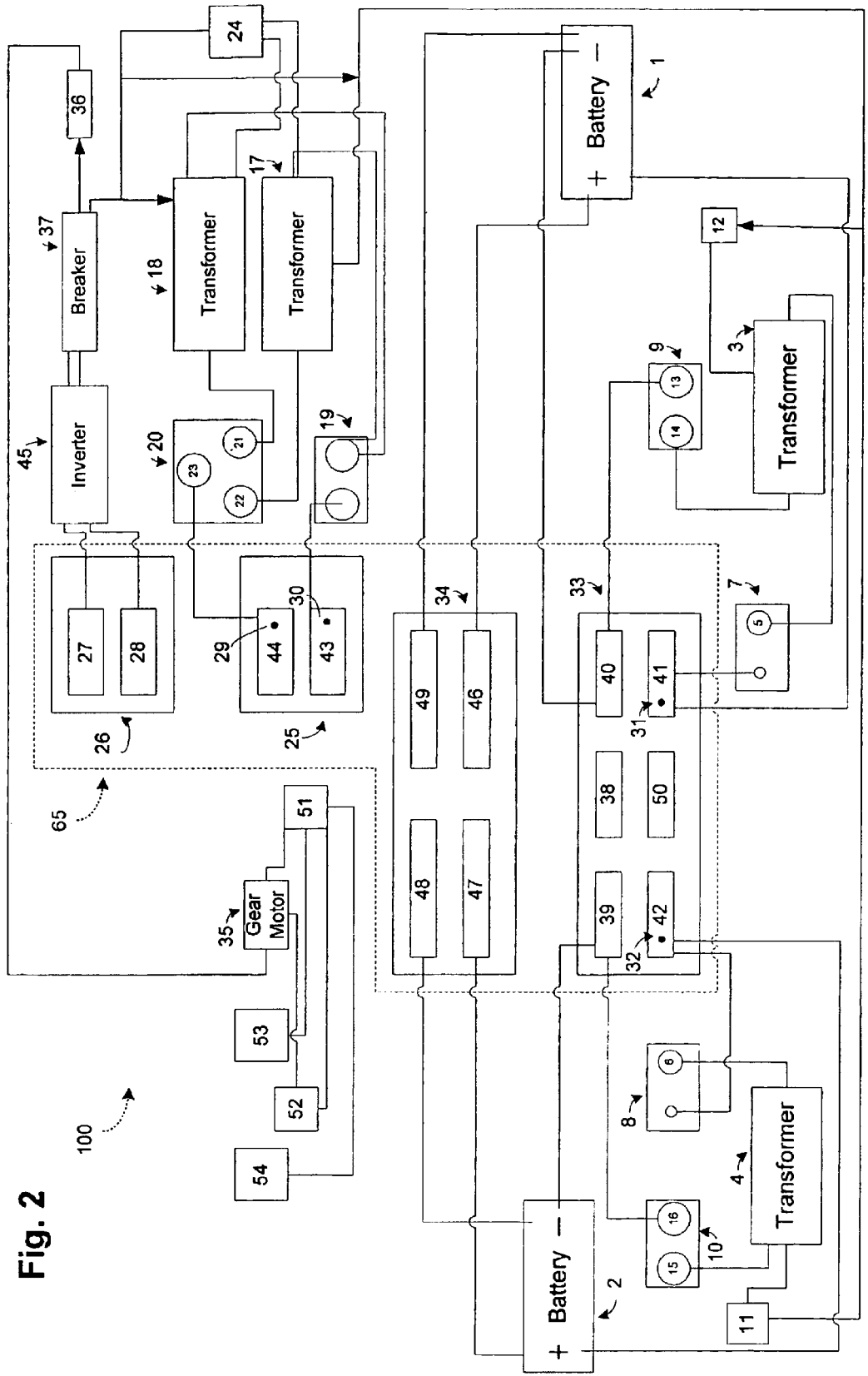
FIG. 2 is a schematic diagram of the drawing in FIG. 1 illustrating a generator with two batteries and an exchanger switch in accordance with an exemplary embodiment of the present invention.

Referring to FIGS. 1 and 2, an exemplary embodiment of the present invention is illustrated. Specifically, FIGS. 1 and 2 illustrate use of a mechanical exchanger switch 65 in a generator 100 comprising two batteries 1 and 2. FIG. 1 is an isometric view of the components of the generator 100. FIG. 2 is a schematic view of the components of generator 100 to facilitate viewing how the components are connected. The exemplary embodiment illustrated in FIGS. 1 and 2 is an electrical generator 100 capable of providing a typical household or other discreet environment with 2000 to 6000 watts of power for an extended period of time. The operating principles illustrated in FIGS. 1 and 2 can be modified to suit other applications.

Battery 1 is coupled to the exchanger switch 65 and provides a direct current for use as a power source. The terminals of battery 1 are coupled to plates 46 and 49 on lower exchanger plate 34. When upper exchanger plate 26 is in contact with lower exchanger plate 34, the direct current is supplied to plates 27 and 28 and supplied to inverter 45. Inverter 45 converts the direct current from battery 1 to an alternating current which is passed through breaker 37 and supplied to power external loads (not shown). In the exemplary embodiment illustrated in FIGS. 1 and 2, the alternating current from inverter 45 is supplied to converter box 36 and used to operate gear motor 35. Gear motor 35 drives the movement of the upper exchanger plates 25 and 26. The gear motor 35 is coupled to two solenoids 53 and 54 responsible for moving the plates in each direction. The two solenoids 53 and 54 are coupled to two mechanical switches 51 and 52 that alternate the direction of movement of the upper exchanger plates 25 and 26.

In the exemplary embodiment illustrated in FIGS. 1 and 2, the mechanical exchanger switch 65 operates on a timing sequence. In other words, when upper exchanger plates 25 and 26 are moved to the right by the gear motor 35, they will eventually actuate switch 51 causing the upper exchanger plates 25 and 26 to start moving in the opposite direction (to the left in FIGS. 1 and 2). Upper exchanger plates 25 and 26 will continue moving to the left until they actuate switch 52 and then will again start moving toward the right. The speed with which the upper exchanger plates 25 and 26 slide from side to side controls the frequency with which battery 1 switches from a power supply mode to a recharging mode. When the upper exchanger plate 26 moves to the left in FIGS. 1 and 2, direct current is supplied to plates 27 and 28 from battery 2 via plates 47 and 48 on lower exchanger plate 34. When upper exchanger plate 26 is in the left position, battery 2 is providing power and battery 1 is in recharging mode.

In other embodiments of the present invention different types of exchanger switches can be implemented. For example, mechanical exchanger switches can be implemented as cylinders that slide or rotate to the appropriate contact points. In yet other embodiments of the invention an electrical exchanger switch can be implemented with electronic components. Furthermore, while the mechanical exchanger switch illustrated in FIGS. 1 and 2 operates on a timing sequence, other exchanger switches can operate on different principles. For example, in an embodiment implementing an electrical exchanger switch the switch can be activated by a designated voltage level. In such an embodiment, a battery can be switched from a power supply mode to a recharging mode when its voltage drops to a designated level.

Referring again to the embodiment illustrated in FIGS. 1 and 2, while a portion of the alternating current from the inverter 45 is used to power an external load, another portion of the alternating current is supplied to transformers 17 and 18. Transformers 17 and 18 are controlled by control switch 24. Transformers 17 and 18 increase the voltage of the alternating current before it passes to diodes 21 and 22 located on voltage plate 20. Direct current passes from connector 23 to plate 44 via connector 29 on upper exchanger plate 25. Similarly, negative charge passes from plate 19 to plate 43 via connector 30 on upper exchanger plate 25. The upper exchanger plate 25 slides laterally over lower exchanger plate 33. Direct current can pass from plates 43 and 44 on the upper exchanger plate 25 to the sets of plates on the lower exchanger plate 33. For example, at one end of the lateral motion, plates 43 and 44 conduct direct current to plates 40 and 41. At the other end of the lateral motion, plates 43 and 44 conduct direct current to plates 39 and 42. Batteries 1 and 2 can alternately receive direct current for recharging depending on the position of upper exchanger plate 25. Neutral plates 50 and 38 act as a breaker to prevent one of the batteries from depleting the other battery as upper exchanger plate 25 slides laterally.

In the embodiment illustrated in FIGS. 1 and 2 another portion of the alternating current from inverter 45 is supplied to transformers 3 and 4. Control switches 11 and 12 control transformers 4 and 3, respectively. Transformers 3 and 4 increase the voltage of the alternating current before it is converted to a direct current by diodes 5, 6, 14, and 15. Negatively charged plates 9 and 10 conduct charge to connectors 13 and 16, respectively. Direct current is fed from plates 7 and 8 and connectors 13 and 16 to the plates located on lower exchanger plate 33. The direct current is then fed from lower exchanger plate 33 to batteries 1 and 2 via connectors 31 and 32 for recharging. The embodiment illustrated in FIGS. 1 and 2 includes two sources of recharging direct current. Direct current is supplied to lower exchanger plate 33 from the sliding upper exchanger plate 25 and from diodes 5, 6, 14, and 15 that are coupled to the lower exchanger plate 33. Alternative embodiments of the present invention can only include a single source of recharging direct current so that one battery is recharging while another battery is supplying power.

Figure 3:
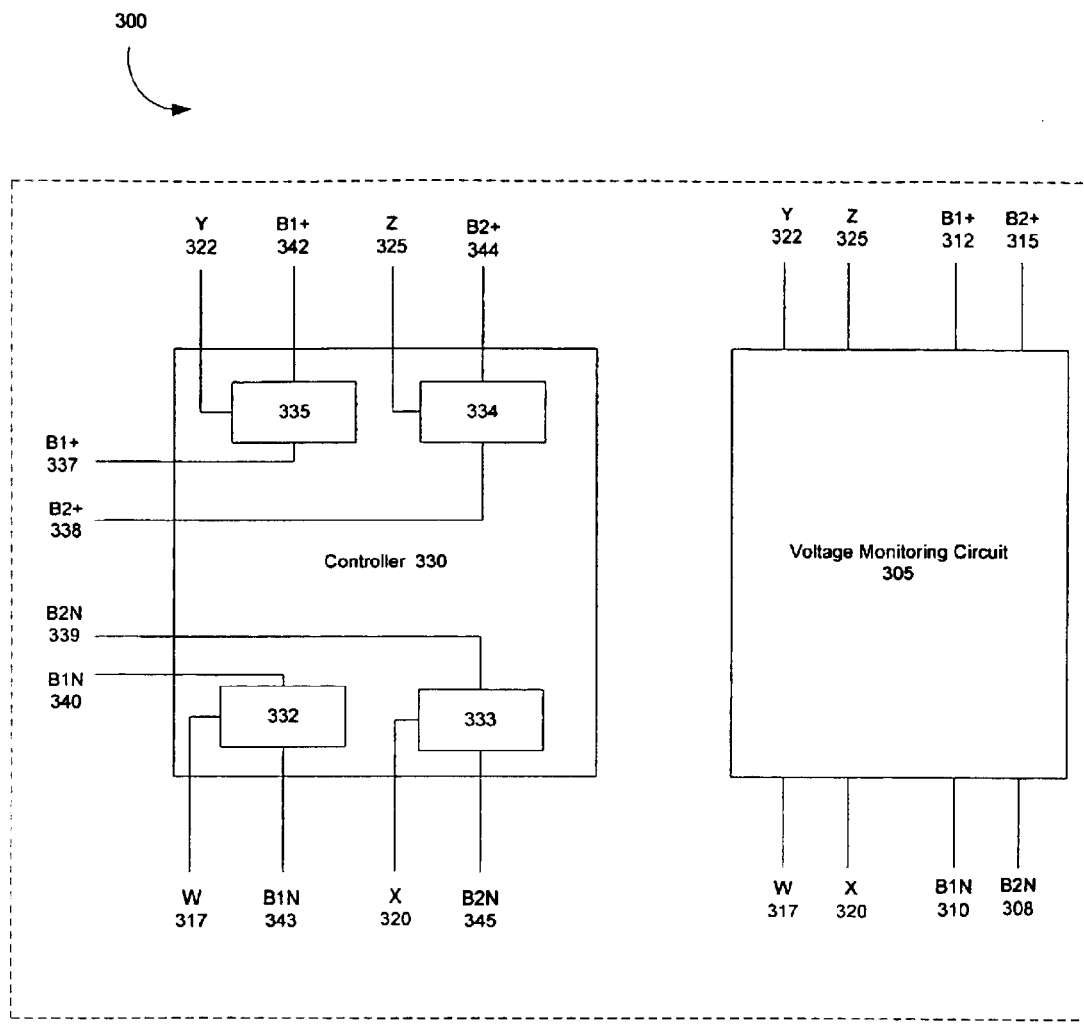
FIG. 3 is a schematic diagram illustrating an electronic exchanger switch in accordance with an exemplary embodiment of the present invention.

FIG. 3 illustrates an exemplary electronic exchanger switch 300 in accordance with another embodiment of the present invention. The electronic exchanger switch 300 can be used in place of the mechanical exchanger switch 65 illustrated in FIGS. 1 and 2. Essentially, the electronic components in switch 300 replace the sliding plates of the mechanical exchanger switch 65. In contrast to the mechanical exchanger switch 65 which is based on a timing mechanism, the electronic exchanger switch 300 makes switching decisions based on voltage readings from the batteries. In alternate embodiments of the invention, the electronic switch 300 can also operate on a timing principle. The electronic exchanger switch 300 illustrated in FIG. 3 is equipped to support switching for two batteries. In other embodiments of invention, more complex electronic exchanger switches can be employed for switching among more than two batteries.

Electronic exchanger switch 300 comprises a voltage monitoring circuit 305 coupled to two batteries B1 and B2 (not shown) through leads 308, 310, 312, and 315. The voltage monitoring circuit 305 is coupled to controller 330 through leads W 317, X 320, Y 322, and Z 325. The controller 330 is also coupled to batteries B1 and B2 and controls the flow of current from the batteries to the external load using switches 332, 333, 334, and 335. While switches 332, 333, 334, and 335 can comprise a variety of conventional electrical components, one common example is a thyristor. The switches 332, 333, 334, and 335 are coupled to the batteries B1 and B2 through leads 337, 338, 339, and 340.

When the voltage monitoring circuit 305 detects a drop in voltage in battery B1, for example, the voltage drop is communicated to switches 332 and 335 via connections W 317 and Y 322. Switches 332 and 335 switch off and prevent battery B1 from providing additional power to the external load. Before switches 332 and 335 switch off, connections X 320 and Z 325 communicate with switches 333 and 334 so that they are turned on to allow battery B2 to provide power to the external load. Although not illustrated in FIG. 3, additional switching components can be added to direct a portion of current from the battery providing power to the battery requiring recharging. The electronic exchanger switch 300 allows batteries B1 and B2 to alternate between power source mode and recharging mode so as to prolong the life of both of the batteries.

Figure 4:
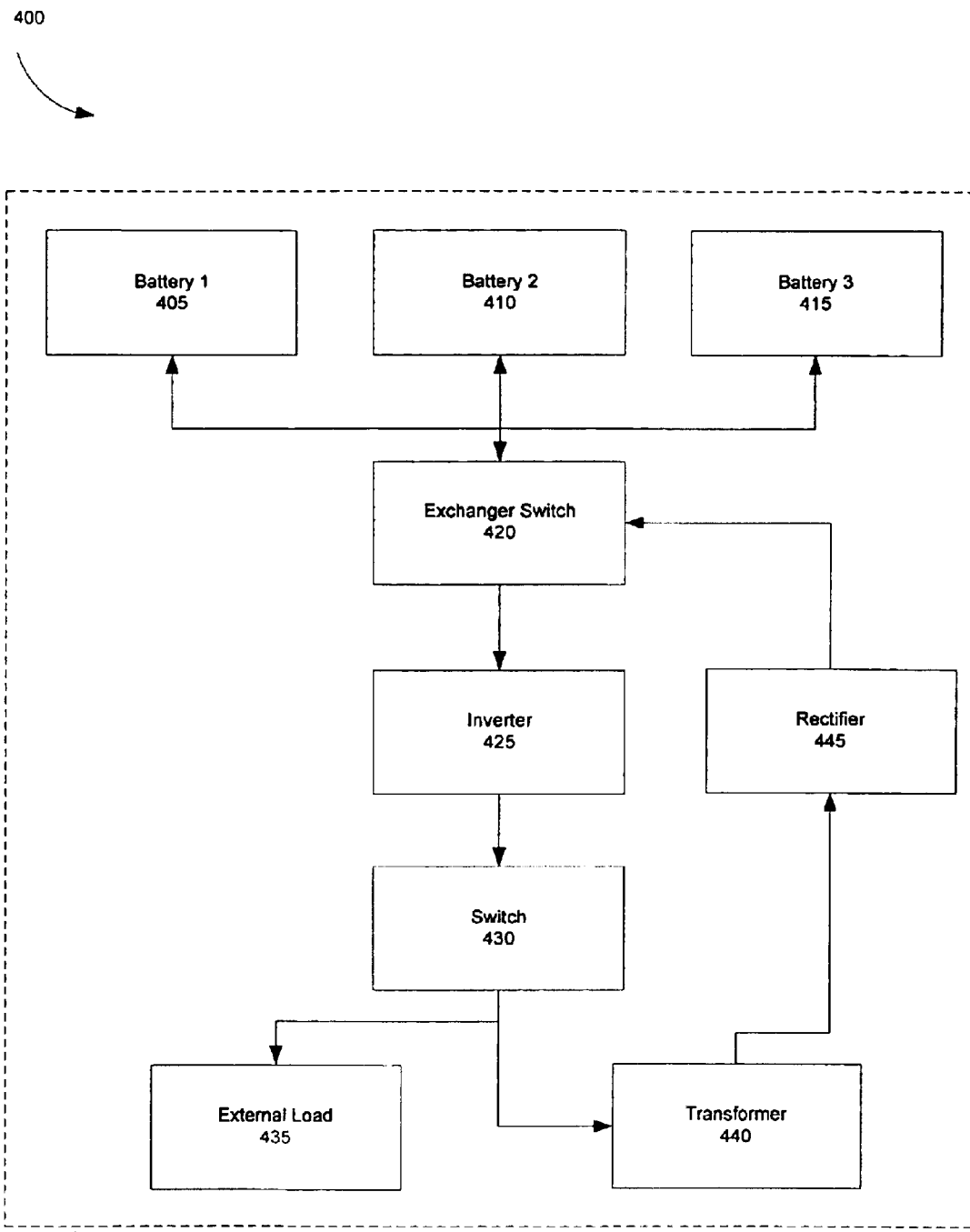
FIG. 4 is a schematic diagram illustrating a generator with three batteries and an exchanger switch in accordance with an exemplary embodiment of the present invention.

FIG. 4 is a block diagram illustrating the relationships between the primary components of a generator implementing an exchanger switch. FIG. 4 shows a generalized generator 400 in accordance with an exemplary embodiment of the present invention. Generator 400 uses three batteries 405, 410, and 415, however, three is not a required number and other embodiments can employ other combinations of multiple batteries. The three batteries 405, 410, and 415 are coupled to an exchanger switch 420. The exchanger switch 420 controls the flow of current to and from each of the batteries depending on whether a battery is providing power, receiving recharging, or is static.

The exchanger switch 420 supplies direct current from one of the batteries to inverter 425 for converting to an alternating current. Switch 430 receives the alternating current from the inverter 425 and divides the alternating current between the external load 435 and return current for recharging one of the batteries. The voltage of the return alternating current is increased with transformer 440 and converted to a direct current with rectifier 445. Finally, the exchanger switch 420 receives the direct current from the rectifier 445 and uses it to recharge one of the batteries. Those skilled in the art will recognize that generator 400 is merely an exemplary embodiment of the invention and other embodiments can comprise additional components or may substitute certain components illustrated in FIG. 4 with other conventional electronic components.

Figure 5:
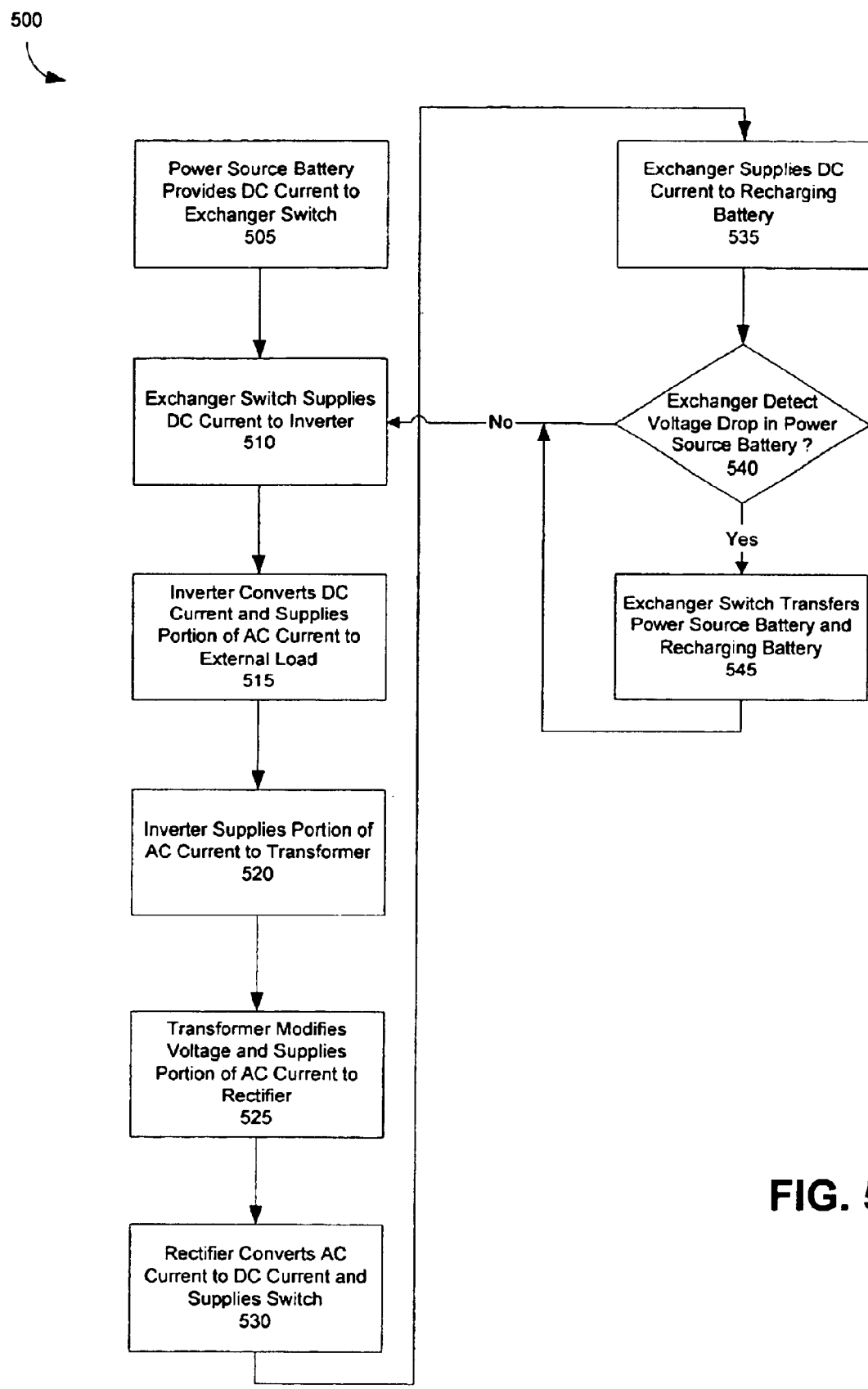
FIG. 5 is a logic flow diagram illustrating a method for operating the exchanger switch in accordance with an exemplary embodiment of the present invention.

FIG. 5 illustrates process 500 for implementing an exchanger switch in a generator in accordance with an exemplary embodiment of the present invention. Process 500 begins with a battery 405 that provides direct current to the exchanger switch 420 in step 505. The exchanger switch 420 receives direct current from the battery 405 while the other batteries 410 and 415 are either recharging or are in static mode. In alternative embodiments of the present invention the exchanger switch can receive direct current from more than one battery and can supply recharging current to more than one battery. The exchanger switch 420 provides direct current to the inverter 425 in step 510. In step 515 the inverter 425 converts the direct current to alternating current and supplies the alternating current to an external load 435. In a typical embodiment of the present invention the inverter supplies approximately 70% of the alternating current to the external load 435 while 30% is used for recharging purposes. The inverter can use a switch 420 to accomplish dividing the alternating current between the external load 435 and the recharging portion.

In step 520 a transformer 440 receives the portion of the alternating current for recharging. The transformer 440 increases the voltage in order to increase the recharging current and supplies the alternating current to the rectifier 445 in step 525. In step 530 the rectifier converts the alternating current to direct current and supplies the direct current to the exchanger switch 420. As illustrated in FIGS. 1 and 2, direct current can also be applied directly to a recharging battery without the exchanger switch. In step 535 the exchanger switch 420 supplies direct current to battery 2 410 for recharging. While battery 2 410 is recharging, the exchanger switch 420 may detect that battery 1 requires recharging based on a drop in voltage in step 540. If the exchanger switch 420 detects a drop in voltage in the battery providing power, the exchanger switch 420 can switch to battery 3 415 as the power source and begin providing direct current to battery 1 405 for recharging in step 545. If no drop in voltage is detected in step 540, exemplary process 500 can return to step 510 and continue to iterate until another battery needs charging. When another battery needs charging, the exchanger switch 420 can make the appropriate adjustment and the recharged batteries can continue to provide power to the external load 435 while simultaneously providing recharging power for another battery. Exemplary process 500 can substantially increase the total life of the batteries by efficiently managing the power each battery provides.

In conclusion, the present invention, as represented in the foregoing exemplary embodiments, provides a system and method for efficiently using and managing the power provided by multiple batteries. The exchanger switch can be set to alternate between two or more batteries so that no single battery is depleted quickly. When one battery begins to lose power, the exchanger switch can begin drawing power from another battery. The other battery can also provide recharging current to the first weakened battery. The exchanger switch can also support switching among more than two batteries. Implementing the exchanger switch in a power supply system increases the useful life of the batteries by using the battery power more efficiently.

It will be appreciated that the present invention fulfills the needs of the prior art described herein and meets the above-stated objects. While the preferred embodiments of the invention have been shown and described, it will be evident to those skilled in the art that various modifications and changes may be made thereto without departing from the spirit and the scope of the invention as set forth in the appended claims and equivalents thereof. For instance, in addition to electrical generators, the present invention can be implemented in other types of electrical systems that rely on battery power. The invention can also be adapted to use a variety of different types of mechanical and electrical exchanger switches to manage the efficient use of power from the batteries.

What is claimed is:

1. A system for managing the use of a first battery and a second battery in a generator comprising:

an inverter operable for receiving a first direct current from the first battery and providing an alternating current to a switch, the switch operable for directing a first portion of the alternating current to an external load and directing a second portion of the alternating current to a transformer;

a rectifier operable for converting the second portion of the alternating current received from the transformer to a second direct current; and an exchanger switch operable for directing the second direct current to the second battery, the exchanger switch further operable for altering the direction of the second direct current to the first battery.

2. The system of claim 1, wherein the exchanger switch is operable for altering the direction of the second direct current to the first battery upon the voltage of the first battery reaching a certain level.

3. The system of claim 1, wherein the exchanger switch is operable for altering the direction of the second direct current to the first battery upon a designated time.

4. The system of claim 1, wherein the exchanger switch is further operable for directing the first direct current from the first battery to the inverter.

5. The system of claim 1, wherein the exchanger switch is further operable for altering the source of the first direct current received at the inverter from the first battery to the second battery.

6. The system of claim 1, wherein the exchanger switch comprises:

at least one stationary exchanger plate, the stationary exchanger plate comprising a first contact plate and a second contact plate coupled to the terminals of the first battery and a third contact plate and a fourth contact plate coupled to the terminals of the second battery; and at least one mobile exchanger plate, the mobile exchanger plate coupled to the inverter and comprising a first mobile contact plate and a second mobile contact plate.

7. The system of claim 6, further comprising a motor for moving the mobile exchanger plate laterally over the stationary exchanger plate.

8. The system of claim 1, wherein the exchanger switch comprises:

a voltage monitoring circuit operable for monitoring the voltage of the first battery and the second battery; and a controller coupled to the voltage monitoring circuit, the controller operable for controlling the flow of direct current from the first battery and the second battery.

9. A system for managing the supply of power from a first battery comprising:

an exchanger switch operable for receiving a first direct current from the first battery and supplying the first direct current to an inverter, the inverter operable for converting the first direct current to an alternating current;

a switch operable for directing a portion of the alternating current to a rectifier, the rectifier operable for converting the portion of the alternating current to a second direct current and supplying the second direct current to the exchanger switch; and a second battery operable for receiving the second direct current from the exchanger switch for charging.

10. The system of claim 9, wherein the switch is further operable for directing another portion of the alternating current to an external load.

11. The system of claim 9, further comprising a transformer operable for increasing the voltage of the alternating current.

12. The system of claim 9, further comprising a third battery operable for supplying a third direct current to the exchanger switch.

13. The system of claim 12, wherein the exchanger switch is further operable for supplying the second direct current to the first battery for charging.

14. The system of claim 9, wherein the exchanger switch comprises:
at least one stationary exchanger module, the stationary exchanger module comprising a first contact and a second contact coupled to the terminals of the first battery and a third contact and a fourth contact coupled to the terminals of the second battery; and
at least one mobile exchanger module, the mobile exchanger module coupled to the inverter and comprising a first mobile contact and a second mobile contact.

15. The system of claim 9, wherein the exchanger switch comprises:
a voltage monitoring circuit operable for monitoring the voltage of the first battery and the second battery; and
a controller coupled to the voltage monitoring circuit, the controller operable for controlling the flow of direct current from the first battery and the second battery.

16. A method for managing the use of a first battery and a second battery comprising the steps of:
supplying a source direct current from the first battery to an exchanger switch;
supplying the source direct current from the exchanger switch to an inverter operable for converting the source direct current to an alternating current;
supplying a first portion of the alternating current to an external load;
transforming a second portion of the alternating current and rectifying the second portion of the alternating current to convert the second portion of the alternating current to a recharging direct current;
supplying the recharging direct current to the exchanger switch; and
supplying the recharging direct current to the second battery.

17. The method of claim 16, further comprising the steps of:
receiving a voltage reading for the first battery;
modifying the source direct current so that it is received from the second battery; and
modifying the recharging direct current so that it is supplied to the first battery.

18. The method of claim 16, further comprising the steps of:
activating the exchanger switch based on a designated time;
modifying the source direct current so that it is received from the second battery; and
modifying the recharging direct current so that it is supplied to the first battery.

19. The method of claim 16, further comprising the steps of:
activating the exchanger switch;
modifying the source direct current so that it is received from a third battery; and
modifying the recharging direct current so that it is supplied to the first battery.

20. A method for managing the use of a first battery and a second battery comprising the steps of:
receiving a direct current from the first battery at an exchanger switch;
providing the direct current from the exchanger switch to an inverter operable for converting the direct current to an alternating current;
rectifying a portion of the alternating current to create a recharging direct current; and
supplying the recharging direct current to the second battery.

21. The method of claim 20, further comprising the step of transforming the portion of the alternating current to increase the voltage.

22. The method of claim 20, further comprising the step of providing another portion of the alternating current to an external load.

23. The method of claim 20, further comprising the steps of:
receiving a voltage reading for the first battery; and
modifying the direct current so that it is received from the second battery.

24. The method of claim 20, further comprising the step of supplying the recharging direct current to the first battery and the second battery simultaneously.

25. The method of claim 20, further comprising the steps of:
activating the exchanger switch; and
modifying the direct current so that it is received from the second battery.

26. The method of claim 20, further comprising the steps of:
activating the exchanger switch; and
modifying the direct current so that it is received from a third battery.

27. The method of claim 20, further comprising the steps of:
supplying a portion of the recharging direct current to the exchanger switch; and
supplying the portion of the recharging direct current to the second battery.

* * * * *